(12) United States Patent
Zheng et al.

(10) Patent No.: US 12,081,913 B2
(45) Date of Patent: *Sep. 3, 2024

(54) CAMERA PLATFORM INCORPORATING SCHEDULE AND STATURE

(71) Applicant: eBay Inc., San Jose, CA (US)

(72) Inventors: Shuai Zheng, Berkeley, CA (US); Fan Yang, San Jose, CA (US); Mohammadhadi Kiapour, San Francisco, CA (US); Qiaosong Wang, San Jose, CA (US); Japjit S. Tulsi, Los Altos Hills, CA (US); Robinson Piramuthu, Oakland, CA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/302,714

(22) Filed: Apr. 18, 2023

(65) Prior Publication Data

US 2023/0254455 A1 Aug. 10, 2023

Related U.S. Application Data

(63) Continuation of application No. 17/170,549, filed on Feb. 8, 2021, now Pat. No. 11,665,320, which is a (Continued)

(51) Int. Cl.
*H04N 7/18* (2006.01)
*G06F 18/214* (2023.01)
(Continued)

(52) U.S. Cl.
CPC ........... *H04N 7/185* (2013.01); *G06F 18/214* (2023.01); *G06N 20/00* (2019.01);
(Continued)

(58) Field of Classification Search
CPC ........ H04N 7/185; H04N 23/63; H04N 23/61; H04N 23/631; H04N 21/2187;
(Continued)

(56) References Cited

U.S. PATENT DOCUMENTS 8,068,676 B2 11/2011 Zhang et al.
8,121,618 B2 2/2012 Rhoads et al.
(Continued)

FOREIGN PATENT DOCUMENTS

CN 104081379 10/2014
CN 105094311 11/2015
(Continued)

OTHER PUBLICATIONS 201880059042.9 , "Foreign Office Action", CN Application No. 201880059042.9, dated Aug. 30, 2023, 6 pages.
(Continued)

*Primary Examiner* — Qian Yang
(74) *Attorney, Agent, or Firm* — FIG. 1 Patents

(57) ABSTRACT

Camera platform techniques are described. In an implementation, a plurality of digital images and data describing times, at which, the plurality of digital images are captured is received by a computing device. Objects of clothing are recognized from the digital images by the computing device using object recognition as part of machine learning. A user schedule is also received by the computing device that describes user appointments and times, at which, the appointments are scheduled. A user profile is generated by the computing device by training a model using machine learning based on the recognized objects of clothing, times at which corresponding digital images are captured, and the user schedule. From the user profile, a recommendation is
(Continued)

generated by processing a subsequent user schedule using the model as part of machine learning by the computing device.

20 Claims, 13 Drawing Sheets

Related U.S. Application Data continuation of application No. 16/673,638, filed on Nov. 4, 2019, now Pat. No. 11,126,849, which is a continuation of application No. 15/859,056, filed on Dec. 29, 2017, now Pat. No. 10,509,962.

(60) Provisional application No. 62/558,836, filed on Sep. 14, 2017.

(51) Int. Cl.
| | | |
|---|---|---|
| *G06N 20/00* | (2019.01) | |
| *G06Q 30/0601* | (2023.01) | |
| *G06Q 30/08* | (2012.01) | |
| *G06T 7/60* | (2017.01) | |
| *G06T 11/60* | (2006.01) | |
| *G06V 10/10* | (2022.01) | |
| *G06V 20/20* | (2022.01) | |
| *G06V 30/194* | (2022.01) | |
| *H04N 23/63* | (2023.01) | |
| *G06F 3/04842* | (2022.01) | |
| *G06F 18/2431* | (2023.01) | |
| *H04N 23/61* | (2023.01) | |

(52) U.S. Cl.
CPC ......... *G06Q 30/0623* (2013.01); *G06Q 30/08* (2013.01); *G06T 7/60* (2013.01); *G06T 11/60* (2013.01); *G06V 10/10* (2022.01); *G06V 20/20* (2022.01); *G06V 30/194* (2022.01); *H04N 23/63* (2023.01); *G06F 3/04842* (2013.01); *G06F 18/2431* (2023.01); *G06Q 30/0631* (2013.01); *G06Q 30/0643* (2013.01); *G06T 2210/16* (2013.01); *H04N 23/61* (2023.01); *H04N 23/631* (2023.01)

(58) Field of Classification Search
CPC . H04N 21/816; G06F 18/214; G06F 3/04842; G06F 18/2431; G06N 20/00; G06N 3/045; G06N 5/01; G06N 20/10; G06Q 30/0623; G06Q 30/08; G06Q 30/0631; G06Q 30/0643; G06Q 10/087; G06T 7/60; G06T 11/60; G06T 2210/16; G06T 19/006; G06V 10/10; G06V 20/20; G06V 30/194; G06V 10/70
See application file for complete search history.

(56) References Cited

U.S. PATENT DOCUMENTS

| | | | |
|---|---|---|---|
| 8,385,971 B2 | 2/2013 | Rhoads et al. | |
| 8,615,524 B2 | 12/2013 | Kanigsberg et al. | |
| 8,965,460 B1 | 2/2015 | Rao et al. | |
| 9,025,864 B2 | 5/2015 | Zhang et al. | |
| 9,179,061 B1 | 11/2015 | Kraft et al. | |
| 9,218,530 B2 | 12/2015 | Davis et al. | |
| 9,240,077 B1 | 1/2016 | Kraft et al. | |
| 9,329,762 B1 | 5/2016 | Schultz et al. | |
| 9,443,199 B2 | 9/2016 | Pinckney et al. | |
| 9,471,912 B2* | 10/2016 | Verkasalo | G06Q 30/0242 |
| 10,008,039 B1 | 6/2018 | Neustein et al. | |
| 10,282,776 B2 | 5/2019 | Jo et al. | |
| 10,311,409 B1 | 6/2019 | Brailovskiy et al. | |
| 10,495,878 B2 | 12/2019 | Chi et al. | |
| 10,509,962 B2 | 12/2019 | Zheng et al. | |
| 10,949,667 B2 | 3/2021 | Zheng et al. | |
| 11,126,849 B2 | 9/2021 | Zheng et al. | |
| 11,659,143 B2 | 5/2023 | Zheng et al. | |
| 11,665,320 B2 | 5/2023 | Zheng et al. | |
| 2009/0304267 A1 | 12/2009 | Tapley et al. | |
| 2010/0046842 A1 | 2/2010 | Conwell et al. | |
| 2010/0191578 A1 | 7/2010 | Tran et al. | |
| 2010/0313141 A1 | 12/2010 | Yu et al. | |
| 2011/0302117 A1 | 12/2011 | Pinckney et al. | |
| 2012/0040612 A1 | 2/2012 | Lee et al. | |
| 2012/0188147 A1 | 7/2012 | Hosein et al. | |
| 2013/0215116 A1 | 8/2013 | Siddique et al. | |
| 2013/0293580 A1 | 11/2013 | Spivack | |
| 2014/0185871 A1 | 7/2014 | Ito et al. | |
| 2014/0267792 A1 | 9/2014 | Mullins | |
| 2014/0337174 A1 | 11/2014 | Lin et al. | |
| 2015/0206257 A1 | 7/2015 | Harada | |
| 2015/0286873 A1 | 10/2015 | Davis et al. | |
| 2016/0026253 A1 | 1/2016 | Bradski et al. | |
| 2016/0070439 A1 | 3/2016 | Bostick et al. | |
| 2016/0189039 A1 | 6/2016 | Leppanen et al. | |
| 2017/0064260 A1* | 3/2017 | Wexler | G06V 40/172 |
| 2017/0083789 A1 | 3/2017 | Shah et al. | |
| 2017/0109609 A1 | 4/2017 | Hill et al. | |
| 2017/0132841 A1 | 5/2017 | Morrison | |
| 2017/0372268 A1 | 12/2017 | Ilan et al. | |
| 2018/0082479 A1 | 3/2018 | Zhang | |
| 2018/0150892 A1 | 5/2018 | Waldron et al. | |
| 2018/0158134 A1 | 6/2018 | Hassan | |
| 2018/0197223 A1 | 7/2018 | Grossman | |
| 2018/0218433 A1 | 8/2018 | Penner et al. | |
| 2018/0300791 A1 | 10/2018 | Ganesan et al. | |
| 2019/0066304 A1 | 2/2019 | Hirano et al. | |
| 2019/0080171 A1 | 3/2019 | Zheng et al. | |
| 2019/0080172 A1 | 3/2019 | Zheng et al. | |
| 2020/0065588 A1 | 2/2020 | Zheng et al. | |
| 2021/0158046 A1 | 5/2021 | Zheng et al. | |
| 2021/0312180 A1 | 10/2021 | Zheng et al. | |

FOREIGN PATENT DOCUMENTS

| | | |
|---|---|---|
| CN | 106462979 | 2/2017 |
| JP | 2012014544 A | 1/2012 |
| KR | 1020120015803 | 2/2012 |
| KR | 20160128119 | 11/2016 |
| KR | 20160144665 | 12/2016 |
| WO | WO-2013063299 | 5/2013 |
| WO | WO-2014063157 | 4/2014 |
| WO | WO-2016175412 | 11/2016 |
| WO | WO-2019055352 | 3/2019 |

OTHER PUBLICATIONS

"Examiner Interview Summary", U.S. Appl. No. 15/858,463, dated May 17, 2019, 3 pages.
"Examiner Interview Summary", U.S. Appl. No. 15/858,463, dated Nov. 21, 2019, 3 pages.
"Final Office Action", U.S. Appl. No. 15/858,463, dated Oct. 2, 2019, 16 pages.
"International Preliminary Report on Patentability", Application No. PCT/US2018/050280, dated Mar. 17, 2020, 9 pages.
"International Search Report and Written Opinion", Application No. PCT/US2018/050280, dated Nov. 26, 2018, 13 pages.
"Non-Final Office Action", U.S. Appl. No. 15/858,463, dated Apr. 14, 2020, 16 pages.
"Non-Final Office Action", U.S. Appl. No. 15/858,463, dated Apr. 18, 2019, 16 pages.
"Notice of Allowance", U.S. Appl. No. 15/859,056, dated Aug. 13, 2019, 9 pages.
"Response to Final Office Action", U.S. Appl. No. 15/858,463, dated Dec. 3, 2019, 10 pages.
"Response to Non-Final Office Action", U.S. Appl. No. 15/858,463, dated Jul. 18, 2019, 11 pages.
"Response to Non-Final Office Action", U.S. Appl. No. 15/859,056, dated Jul. 18, 2019, 11 pages.

(56) References Cited

OTHER PUBLICATIONS

"Response to Restriction Requirement", U.S. Appl. No. 15/859,056, dated Jul. 17, 2019, 8 pages.
"Restriction Requirement", U.S. Appl. No. 15/859,056, dated Jul. 9, 2019, 6 pages.
"Supplemental Amendment", U.S. Appl. No. 15/859,056, dated Aug. 1, 2019, 9 pages.
"Supplemental Notice of Allowability", U.S. Appl. No. 15/859,056, dated Oct. 29, 2019, 2 pages.
"Supplemental Notice of Allowance", U.S. Appl. No. 15/859,056, dated Aug. 29, 2019, 3 pages.
10-2020-7007259, , "Decision for Appeal against Final Rejection received for Korean Patent Application No. 10-2020-7007259, dated Jul. 28, 2022", dated Jul. 28, 2022, 32 Pages.
10-2020-7007259, , "Final Office Action Received for Korean Patent Application No. 10-2020-7007259, dated Dec. 13, 2021", dated Dec. 13, 2021, 5 Pages.
10-2020-7007259, , "Final Office Action Received for Korean Patent Application No. 10-2020-7007259, dated Feb. 9, 2022", dated Feb. 9, 2022, 8 Pages.
10-2020-7007259, , "Office Action received for Korean Patent Application No. 10-2020-7007259, dated Jun. 19, 2021", dated Jun. 19, 2021, 9 Pages.
10-2022-7008248, , "Foreign Office Action", KR Application No. 10-2022-7008248, dated Feb. 14, 2023, 10 pages.
10-2022-7008248, , "Office Action received for Korean Patent Application No. 10-2022-7008248 dated Jul. 1, 2022", dated Jul. 1, 2022, 4 Pages( 1 Page of english Translation & 3 Pages of official Copy).
U.S. Appl. No. 15/858,463, , "Applicant Interview summary received for U.S. Appl. No. 15/858,463 dated Jul. 13, 2020", dated Jul. 13, 2020, 3 Pages.
U.S. Appl. No. 15/858,463, , "Applicant Initiated Interview Summary Received for U.S. Appl. No. 15/858,463, dated Nov. 19, 2020", dated Nov. 19, 2020, 3 Pages.
U.S. Appl. No. 15/858,463, , "Final Office Action Received for U.S. Appl. No. 15/858,463, dated Oct. 9, 2020", dated Oct. 9, 2020, 19 Pages.
U.S. Appl. No. 15/858,463, , "Notice Of Allowance received for U.S. Appl. No. 15/858,463, dated Dec. 9, 2020", dated Dec. 9, 2020, 9 Pages.
U.S. Appl. No. 15/859,056, , "Supplementary Amendment filed Jul. 29, 2019, for U.S. Appl. No. 15/859,056", dated Jul. 29, 2019, 9 Pages.
U.S. Appl. No. 16/673,638, , "Non Final Office Action Received for U.S. Appl. No. 16/673,638, dated Mar. 5, 2021", dated Mar. 5, 2021, 15 Pages.
U.S. Appl. No. 16/673,638, , "Notice of Allowance Received for U.S. Appl. No. 16/673,638, dated May 19, 2021", dated May 19, 2021, 7 Pages.
U.S. Appl. No. 16/673,638, , "Supplemental Notice of Allowability Received for U.S. Appl. No. 16/673,638, dated Aug. 27, 2021", dated Aug. 27, 2021, 2 Pages.
U.S. Appl. No. 17/170,549, , "Final Office Action", U.S. Appl. No. 17/170,549, dated Nov. 1, 2022, 9 pages.
U.S. Appl. No. 17/170,549, , "Non-Final Office Action", U.S. Appl. No. 17/170,549, dated Jul. 13, 2022, 8 pages.
U.S. Appl. No. 17/170,549, , "Notice of Allowance", U.S. Appl. No. 17/170,549, dated Jan. 19, 2023, 7 pages.
U.S. Appl. No. 17/170,549, , "Supplemental Notice of Allowability", U.S. Appl. No. 17/170,549, dated Apr. 26, 2023, 2 pages.
U.S. Appl. No. 17/348,010, , "Non-Final Office Action", U.S. Appl. No. 17/348,010, dated Dec. 9, 2022, 21 pages.
U.S. Appl. No. 17/348,010, , "Notice of Allowance", U.S. Appl. No. 17/348,010, dated Mar. 7, 2023, 7 pages.
U.S. Appl. No. 17/348,010, , "Supplemental Notice of Allowability", U.S. Appl. No. 17/348,010, dated Apr. 17, 2023, 2 pages.
18785474.0, , "Communication under Article 94(3) received for European Patent Application No. 18785474.0, dated Sep. 30, 2021", dated Sep. 30, 2021, 8 Pages.
201880059042.9, , "Foreign Office Action", CN Application No. 201880059042.9, dated Mar. 25, 2023, 8 pages.
Macedo, et al., "Context-Aware Event Recommendation in Event-based Social Networks", RecSys '15: Proceedings of the 9th ACM Conference on Recommender Systems [retrieved Dec. 16, 2022]. Retrieved from the Internet <https://doi.org/10.1145/2792838.2800187>, Sep. 16, 2015, 8 pages.
Simo-Serra, Edgar et al., "Neuroaesthetics in Fashion: Modeling the Perception of Fashionability", 2015 IEEE Conference on Computer Vision and Pattern Recognition (CVPR), Jun. 1, 2015, 9 pages.
Vladimirovich, , "Shopping Recommendation System Based on Metric Analysis of Clothing Descriptions", 2015—Master's Thesis, 2015, 71 pages.
Wang, Haosha , "Machine Fashion: an Artificial Intelligence Based Clothing Fashion Stylist", 2014—Master's Thesis, 2014, 66 pages.
Zhou, Xinyi et al., "Application of Deep Learning in Object Detection", May 2017, 4 pages.
10-2023-7037204 , "Foreign Office Action", KR Application 10-2023-7037204, May 14, 2024, 5 pages.

* cited by examiner

CAMERA PLATFORM INCORPORATING SCHEDULE AND STATURE

RELATED APPLICATIONS

This application claims priority under 35 U.S.C. § 120 to U.S. patent application Ser. No. 17/170,549, filed Feb. 8, 2021, which claims priority under 35 U.S.C. § 120 to U.S. patent application Ser. No. 16/673,638, filed Nov. 4, 2019, which claims priority under 35 U.S.C. § 120 to U.S. patent application Ser. No. 15/859,056, filed Dec. 29, 2017, which claims priority under 35 U.S.C. § 119(e) to U.S. Provisional Patent Application No. 62/558,836, filed Sep. 14, 2017, the entire disclosure of each of which is hereby incorporated by reference.

BACKGROUND

Mobile devices have become an integral part of a user's everyday life. A mobile phone, for instance, may be used to read emails, engage in social media, capture digital images, communicate via instant messages, and so forth. Likewise, wearable devices such as smart watches have continued to expand this interaction. Accordingly, users have access to a wide range of devices in a variety of usage scenarios.

However, configuration as a mobile device may introduce challenges and complexity in support of user interactions with these devices. A mobile phone or smart watch, for instance, may have a limited ability to support entry of text, navigate between files, and so on. Accordingly, user interaction with these devices may be limited and cause computational inefficiencies as a result.

SUMMARY

Camera platform and object inventory control techniques are described. In an implementation, a plurality of digital images and data describing times, at which, the plurality of digital images are captured is received by a computing device. Objects of clothing are recognized from the digital images by the computing device using object recognition as part of machine learning. A user schedule is also received by the computing device that describes user appointments and times, at which, the appointments are scheduled. A user profile is generated by the computing device by training a model using machine learning based on the recognized objects of clothing, times at which corresponding digital images are captured, and the user schedule. From the user profile, a recommendation is generated by processing a subsequent user schedule using the model as part of machine learning by the computing device, which is output is a user interface.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

In the following discussion, an example environment is first described that may employ the techniques described herein. Example procedures and systems are also described and shown as blocks which may be performed in the example environment as well as other environments. Consequently, performance of the example procedures is not limited to the example environment and systems and the example environment and systems are not limited to performance of the example procedures.

Example Environment

Figure 1:
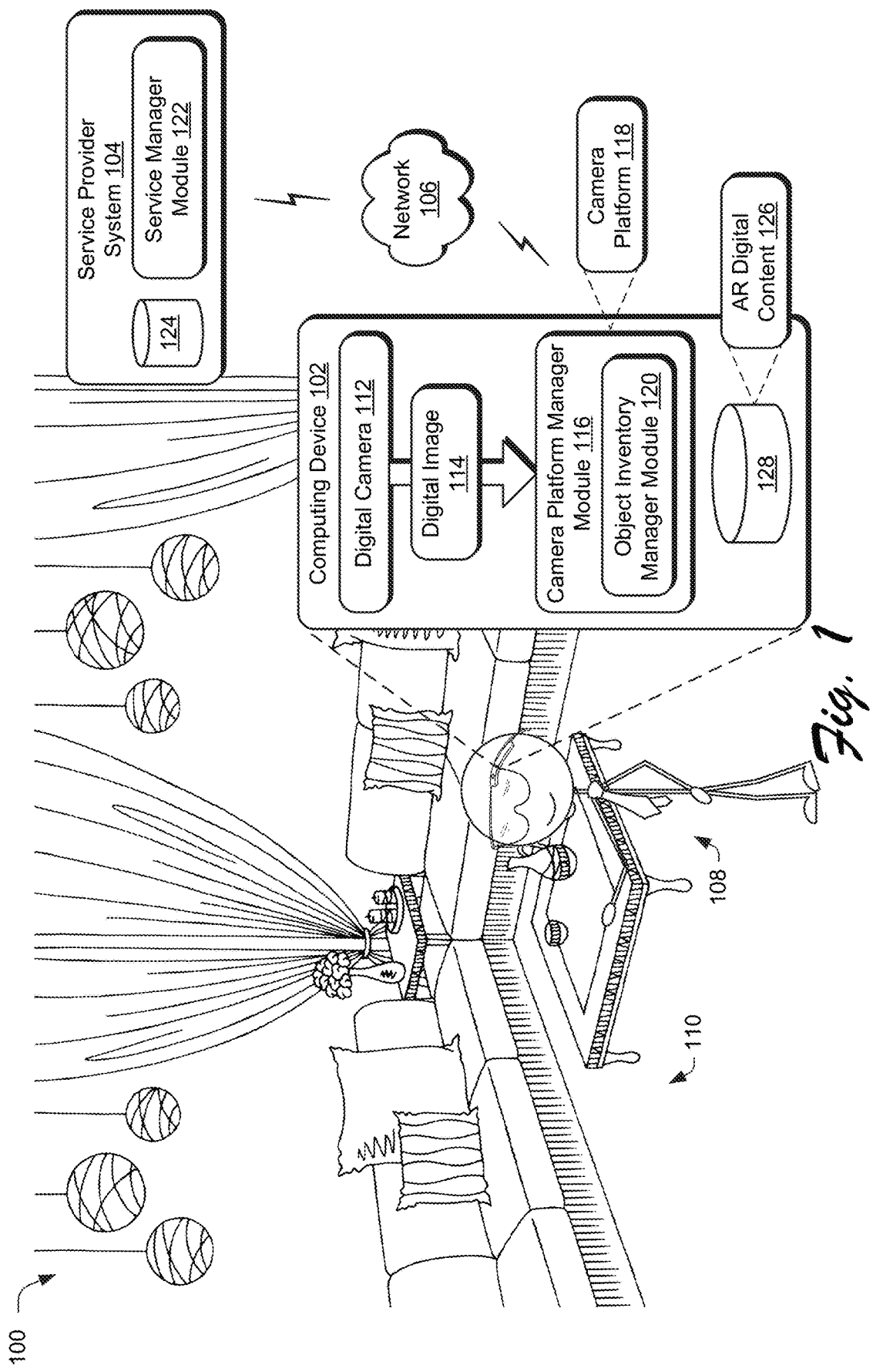
FIG. 1 is an illustration of an environment in an example implementation that is operable to employ camera platform techniques described herein.

FIG. 1 is an illustration of a digital medium environment 100 in an example implementation that is operable to employ digital image capture session techniques described herein. The illustrated environment 100 includes a computing device 102 that is communicatively coupled to a service provider system 104 via a network 106. Computing devices that implement the computing device 102 and the service provider system 104 may be configured in a variety of ways.

A computing device, for instance, may be configured as a desktop computer, a laptop computer, a mobile device (e.g., assuming a handheld configuration such as a tablet or mobile phone), configured to be worn (e.g., as goggles as illustrated for computing device 102) and so forth. Thus, a computing device may range from full resource devices with substantial memory and processor resources (e.g., personal computers, game consoles) to a low-resource device with limited memory and/or processing resources (e.g., mobile devices). Additionally, although a single computing device is shown, a computing device may be representative of a plurality of different devices, such as multiple servers utilized by a business to perform operations "over the cloud" for the service provider system 104 as described in FIG. 13.

The computing device 102 is illustrated as being worn by a user 108 in a physical environment, e.g., a living room 110. The computing device 102 includes a digital camera 112 that is configured to capture digital images 114 of an outside physical environment (e.g., the living room 106), such as through use of a charge coupled device (CCD) sensor. The captured digital images 114 may then be stored as pixels in a computer-readable storage medium and/or rendered for display by a display device, e.g., LCD, OLED, LED, etc.

The computing device 102 also includes a camera platform manager module 116 that is configured to implement and execute a camera platform 118 (e.g., through use of a processing system and computer-readable storage media) that may serve as a basis for a variety of functionality. The camera platform 118, for instance, may implement a "live view" formed of digital images 114 taken of the physical environment of the computing device 102, i.e., a real time output. These digital images 114 may then serve as a basis to support other functionality.

An example of this functionality is illustrated as an object inventory manager module 120. The object inventory manager module 120 is representative of functionality to manage an inventory of objects. This may include objects that are owned by the user 108 and/or objects that are desired by the user 108, e.g., for purchase. This may be implemented by the object inventory manager module 120 through use of the camera platform 118 in a variety of ways.

In a first such example, the object inventory manager module 120 is configured to collect digital images 114. This may include digital images 114 of physical objects in the living room 110 in this example or digital images captured of physical photos, e.g., from a magazine, a picture taken of a television screen or other display device, and so on. The digital image 114 may also be captured of a user interface output by the computing device 102, e.g., as a screenshot from a frame buffer.

The object inventory manager module 120 includes object recognition functionality to recognize objects included within the digital image 114, e.g., via machine learning. From this, the object inventory manager module 120 may collect data pertaining to this recognition. Data describing the recognized objects, for instance, may be communicated via the network 106 to the service provider system 104. The service provider system 104 includes a service manager module 122 that is configured to obtain data related to the objects (e.g., through use of a search) from a storage device 124. This data may then be communicated back to the computing device 102 via the network 106 for use by the object inventory manager module 120.

The object inventory manager module 120, for instance, may generate augmented reality digital content 126 (illustrated as stored in a storage device 128) for output in the user interface of the computing device 102 as part of a "live feed" of digital images taken of the physical environment, e.g., the living room in real time. The AR digital content 126, for instance, may describe characteristics of the object, a brand name of the object, a price for which the object is available for sale or purchase (e.g., via an online auction), and so forth. This AR digital content 126 is then displayed proximal to the object by the object inventory manager module 120. In this way, the camera platform supports functionality for the user 108 to "look around" the living room 110 and object additional information and insight into characteristics of objects included within the physical environment. Further discussion of this example is described in relation to FIGS. 2-6 in the following discussion.

In another example, the object inventory manager module 120 leverages the camera platform 118 to make recommendations for a user. The digital image 114, for instance, may also be processed by the object inventory manager module using object recognition as implemented using machine learning. In this example, the digital images are used to generate a profile (e.g., a user profile) based on characteristics learned from the digital images 114, e.g., to train a model. This profile is then used as a basis to form recommendations (e.g., through machine learning), such as to configure digital marketing content having product suggestions based on these characteristics.

The profile, for instance, may be based on digital images taken of the user 108. From this, the object inventory manager module 120 may determine a likely size (e.g., dimensions) of the user, stature (e.g., how a user wears clothing such as tight, loose, or otherwise how the clothing "hangs" on the user), style (e.g., professional, hippy, grunge, medieval), and so forth. Digital images may also be collected from sources that do not include the user but are desired by the user, e.g., of other humans in person, from physical photos, and so forth.

From this, the object inventory manager module 120 may generate recommendations based on the user profile, such as to generate digital marketing content for products or services based on the size, stature, and style described in the user profile. In this way, the object recognition module may increase accuracy and as a result increase computational efficiency in generation of recommendations based on the camera platform 118. This example is further described in relation to FIGS. 7-12 in the following description.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Camera Platform and Object Inventory Control

Figure 2:
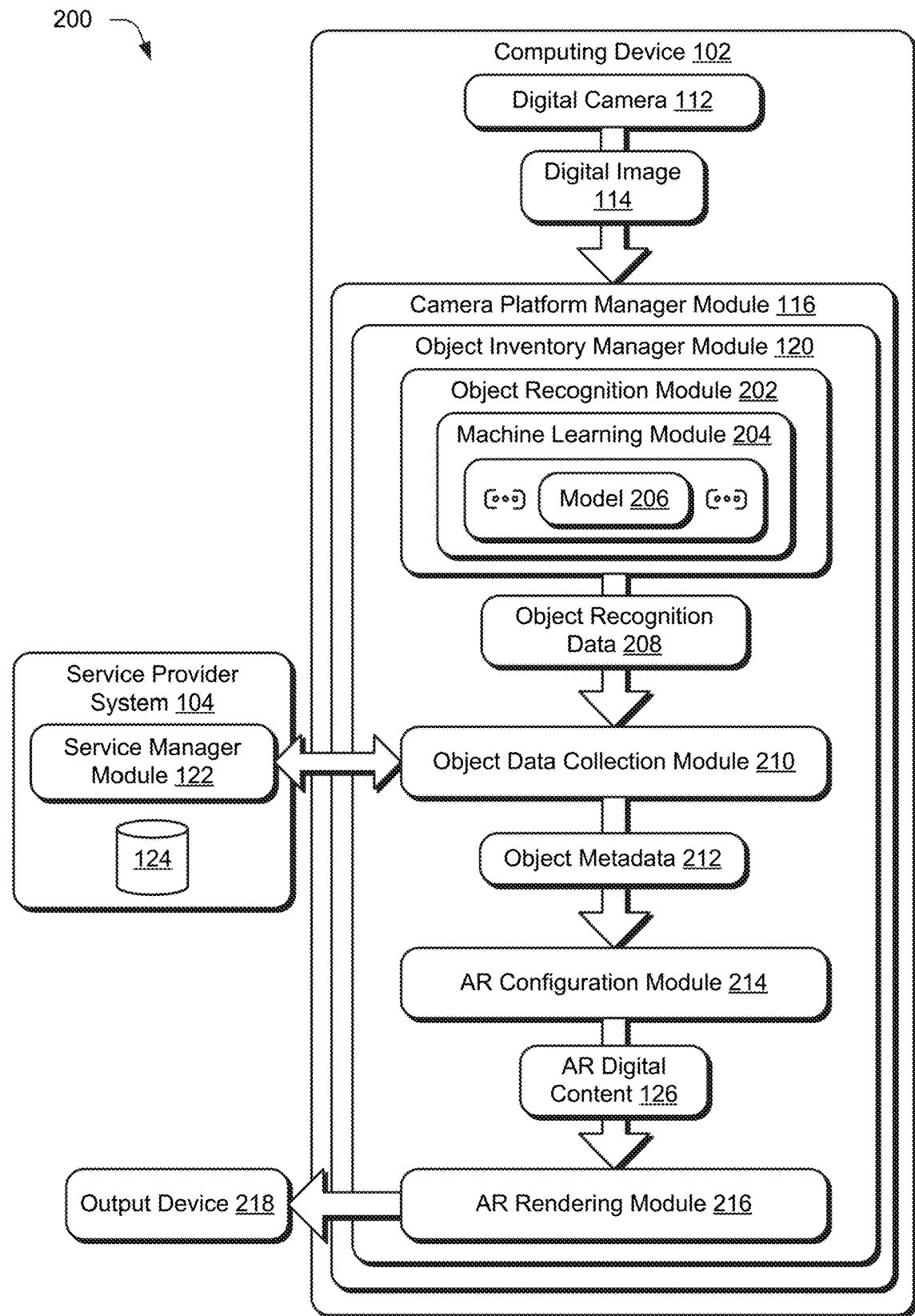
FIG. 2 depicts a system in an example implementation showing operation of a camera platform manager module of FIG. 1 in greater detail.
Figure 3:
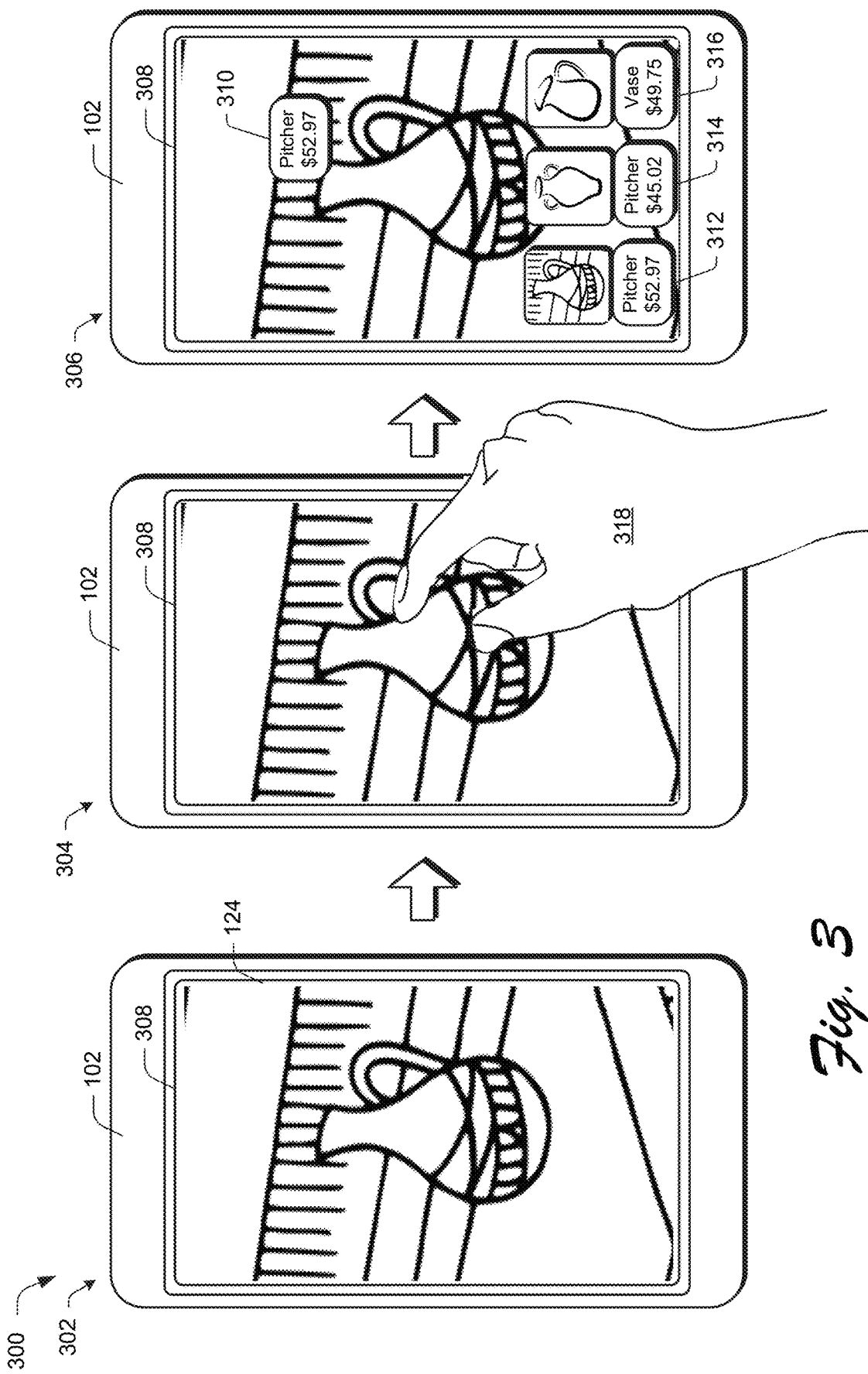
FIG. 3 depicts examples of user interaction with the camera platform manager module as shown using first, second, and third stages to collect metadata related to an object recognized in a digital image.
Figure 4:
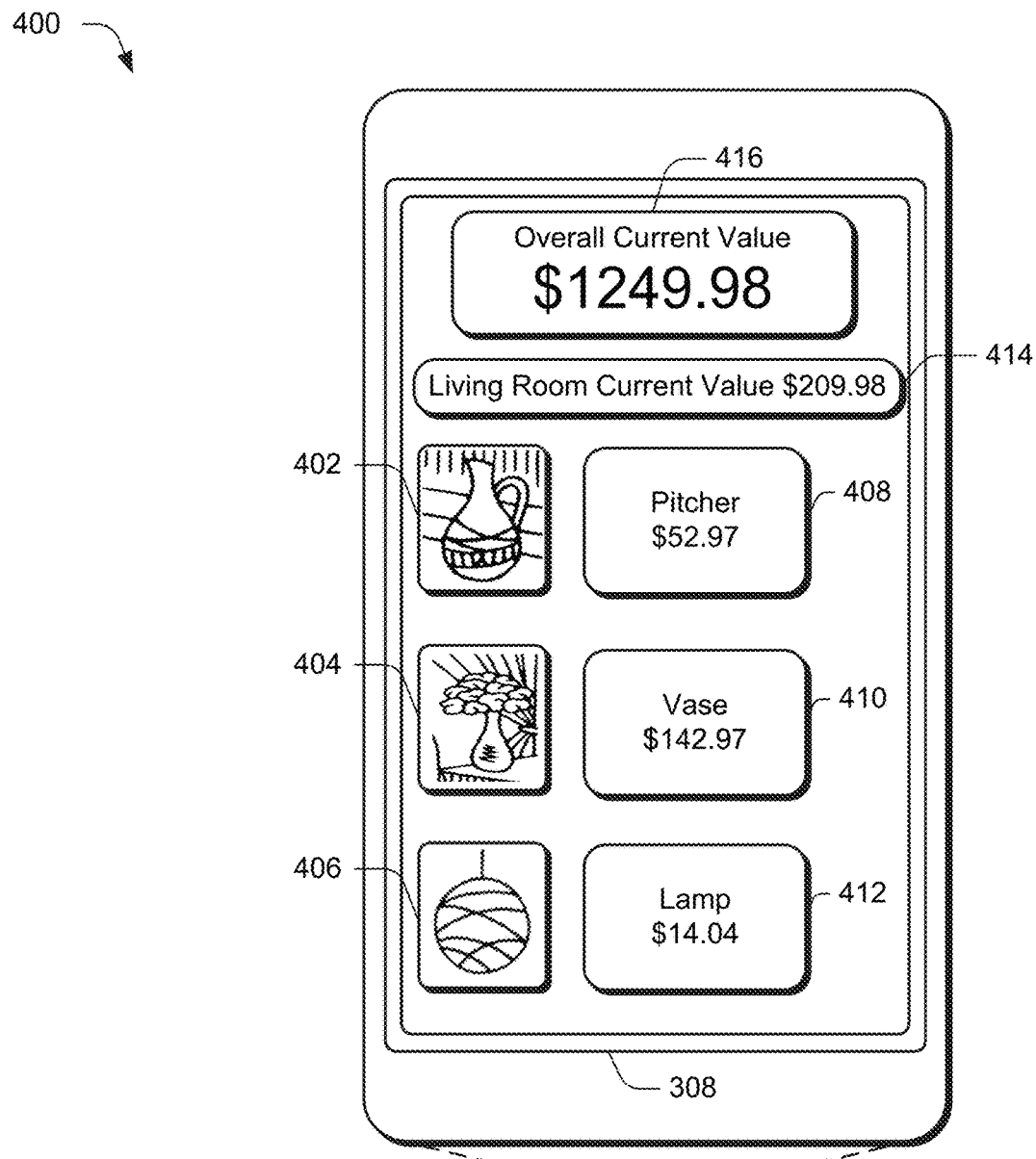
FIG. 4 depicts an example of stored results of recognized objects and corresponding metadata and user-definable collections of the objects.
Figure 5:
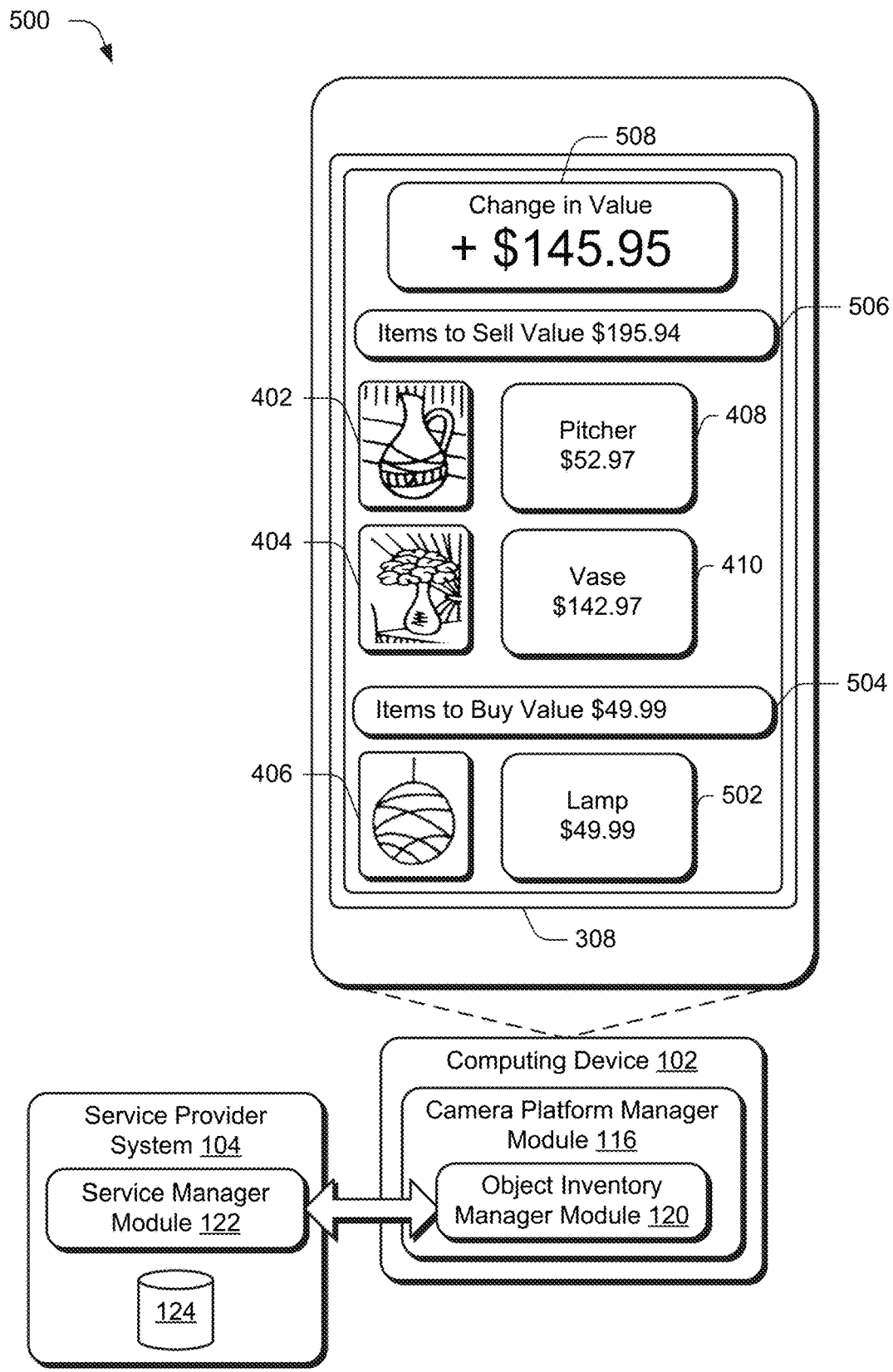
FIG. 5 depicts an example implementation of a user interface configured to support purchase and sale of objects recognized using a camera platform manager module of FIG. 1.
Figure 6:
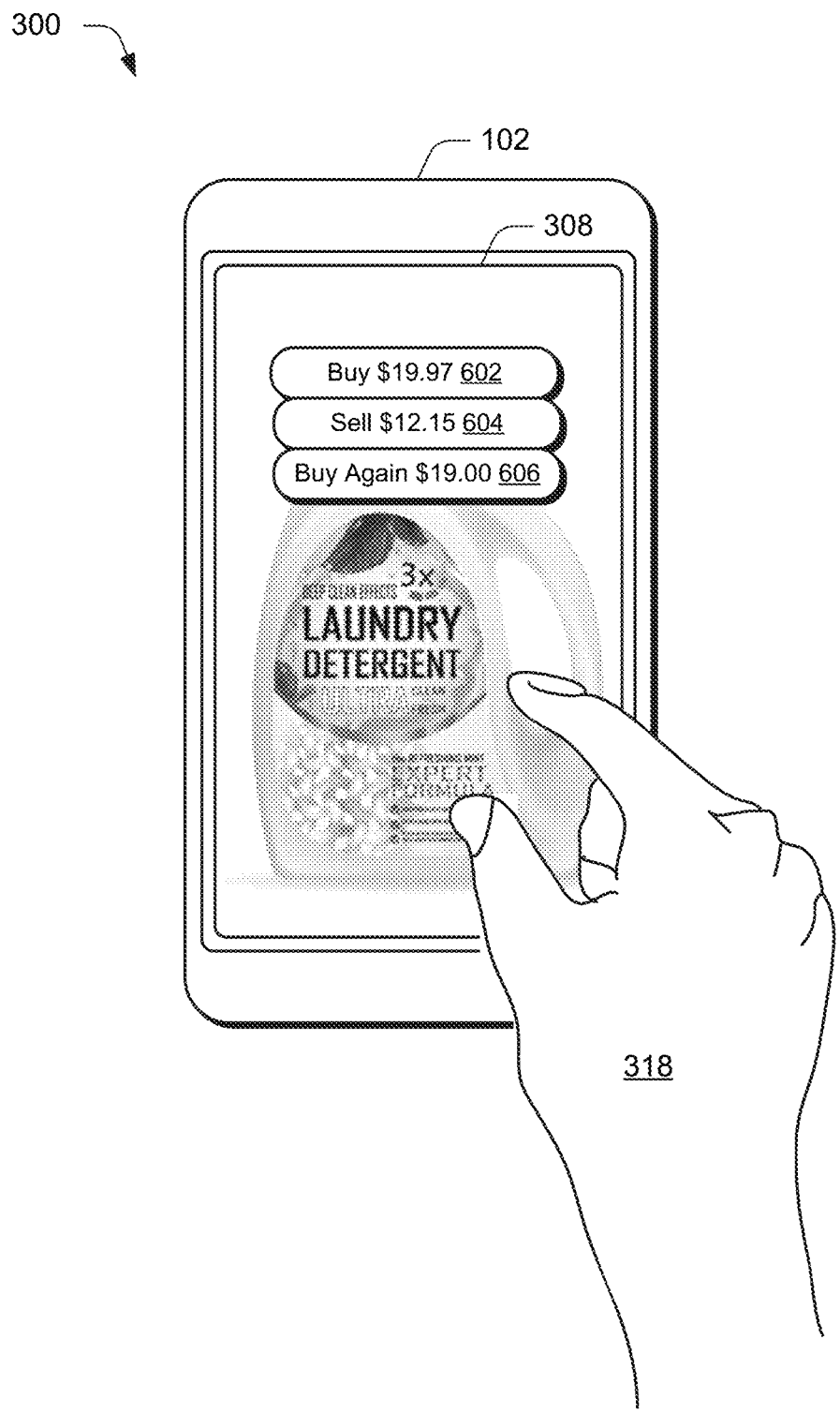
FIG. 6 also depicts implementation of options that are output for purchase or sale of an object recognized from a digital image using the camera platform manager module.

FIG. 2 depicts a system 200 in an example implementation showing operation of the camera platform manager module 116 of FIG. 1 in greater detail. FIG. 3 depicts examples of user interaction with the camera platform manager module 120 as shown using first, second, and third stages 302-306 to collect metadata related to an object recognized in a digital image. FIG. 4 depicts an example of stored results of recognized objects and corresponding metadata and user-definable collections of the objects. FIG. 5 depicts an example implementation of a user interface configured to support purchase and sale of objects recognized using the camera platform manager module 116. FIG. 6 also depicts implementation of options output for purchase or sale of an object recognized from a digital image using the camera platform manager module.

The following discussion describes techniques that may be implemented utilizing the previously described systems and devices. Aspects of the procedure as shown stepwise by the modules of FIG. 2 may be implemented in hardware, firmware, software, or a combination thereof. The procedure is shown as a set of blocks that specify operations performed by one or more devices and are not necessarily limited to the orders shown for performing the operations by the respective blocks. In portions of the following discussion, reference will be made to FIGS. 2-6.

To begin, a digital image 114 is obtained by the camera platform manager module 116. The digital image 114, for instance, may be captured using a digital camera, as a screenshot captured from a frame buffer of the computing device 102, and so forth.

The digital image 114 is then processed by an object recognition module 202 to recognize an object within the digital image 114. The object recognition module 202, for instance, may employ a machine learning module 204 configured to employ models 206 usable to recognize the object using machine learning, e.g., neural networks, convolutional neural networks, deep learning networks, structured vector machines, decision trees, and so forth. The models 206, for instance, may be trained using digital images that are tagged with corresponding identifications. In an implementation, these digital images and tags are obtained from a commerce service provider system that are tagged by sellers using the system. As a result, a multitude of accurately tagged digital images may be obtained with minimal computation and user cost as opposed to conventional manual tagging techniques. Although illustrated as implemented locally by the computing device 102, this functionality may also be implemented in whole or in part by a service provider system 104 via the network 106.

Thus, the object recognition data 208 describes an object included in the digital image 114. An object data collection module 210 is then employed to collect object metadata 212 that pertains to the recognized object. This may be performed locally through a search of a local storage device and/or remotely through interaction with a service manager module 122 of a service provider system 104 via a network 106.

A variety of different types of object metadata 212 may be obtained from a variety of different types of service provider systems 104. In one example, the service provider system 104 provides information relating to purchase or sale of the object, e.g., product name, product description, price for purchase or sale (e.g., based on online auctions), and so forth. In another example, the service provider system 104 provides information relating to customer reviews of the product, e.g., a number of "stars" or other rating, textual reviews, and so forth.

The object metadata 212 in this example is then provided to an augmented reality (AR) configuration module 214. The AR configuration module 214, for instance, may be configured to generate AR digital content 126 from the object metadata 212 for display proximal to the object by an AR rendering module 216 to an output device 218, e.g., display device, audio output device, tactile (i.e., haptic) output device, and so forth. In order to generate haptic effects, many output devices utilize some type of actuator or haptic output device. Examples of known haptic output devices used for this purpose include an electromagnetic actuator such as an Eccentric Rotating Mass ("ERM") in which an eccentric mass is moved by a motor, a Linear Resonant Actuator ("LRA") in which a mass attached to a spring is driven back and forth, or a "smart material" such as piezoelectric, electro-active polymers or shape memory alloys. Haptic output devices also broadly include non-mechanical or non-vibratory devices such as those that use electrostatic friction (ESF), ultrasonic surface friction (USF), or those that induce acoustic radiation pressure with an ultrasonic haptic transducer, or those that use a haptic substrate and a flexible or deformable surface, or those that provide projected haptic output such as a puff of air using an air jet, and so on.

The augmented reality content in this example includes both content supported along with a direct view of a physical environment or content supported along with a recreated view of the physical environment. In this way, through use of a camera platform 118 as implemented by the camera platform manager module 116, a user may simply "look around" using a live feed of digital images 114, select objects in the digital images 114, and obtain metadata related to the object, an example of which is described as follows. This may also include an ability to show items of clothing or accessories as part of a "live feed."

FIG. 3 depicts an example implementation 300 of user interaction with the camera platform 118 as implemented by the camera platform manager module 116. This implementation 300 is illustrated using first, second, and third stages 302, 304, 306.

At the first stage 302, a user interface 308 is output by the output device 218, e.g., a touchscreen display device. The user interface 308 is configured as a "live feed" of digital images 114 obtained in real time from the digital camera 112 in this example.

At the second stage 304, a user input is received that selects an object displayed in the user interface 308. In the illustrated example, the user input is detected as a tap of a finger of the user's hand 318 that is detected using touchscreen functionality of the output device 218. In another example, a click-and-drag operation is performed to specify a rectangular area in a user interface. In this way, a user may distinguish between multiple objects displayed concurrently in the user interface 308. Other examples are also contemplated, such as a spoken utterance or other gestures.

In response to the user selection of the second stage 304, the digital image 114 displayed in the user interface 308 is captured (e.g., obtained from a frame buffer) along with the indication of the location of the particular object, e.g., as guided by X/Y coordinates of the "tap." The digital image 114 is then processed by the object recognition module 202 as described above to identify the object (e.g., the pitcher in the illustrated example) as object recognition data 208.

The object recognition data 208 is then communicated to a service provider system 104 in this example that is configured to support purchase and sale of goods. Accordingly, the service manager module 122 in this example searches a storage device 124 for object metadata 212 that pertains to the identified object. The object metadata 212 is then configured by the AR configuration module 214 to generate AR digital content 126 for output in the live/real time feed of digital images.

As shown at the third stage 306, examples of AR digital content 126 include a name and price 310 (e.g., average price, price for sale, price to buy, etc.) of the object, which is displayed proximal to the object, e.g., the pitcher. The AR rendering module 216 may then configure this content to remain "as is" relative to the view of the object, e.g., based on data received from orientation sensors such as accelerometers, inertial devices, gyroscope, image processing and feature recognition from the digital images, and so forth.

The AR digital content 126 also includes information regarding the same or similar goods 312, 314, 316 that are available for purchase from the service provider system 104, e.g., as part of an online auction, for a set price, etc. In this way, the camera platform manager module 116 implements the camera platform 118 as non-modal within the user interface 308 such that a user remains within a context of a real time "live" feed of digital images and yet still is able to obtain metadata describing objects included in those digital images. The user 108, for instance, may "look around" at different objects within the living room 110 and readily determine how to buy or sell these objects based on real time information obtained from the service provider system 104.

FIG. 4 depicts another example implementation 400 of the user interface 306 that is configured to store and manage an inventory of the objects recognized using the previously described techniques. The user interface 308 includes thumbnails of digital images 402, 404, 406 that were previously processed using the techniques described above and "stored" in response to user interaction with the user interface 306, e.g., indicative of a future interest in respective objects included in the digital images 402-406.

The object inventory manager module 120 is configured in this example to update metadata associated with these objects through communication with the service provider system 104. The communication may follow a "push" model in response to changes in prices, a "pull" model as implemented at scheduled intervals or in response to access of this screen of the user interface 308, and so forth.

The metadata in this example includes current respective names and prices 408, 410, 412, a user specified collection of the objects and associated metadata 414 (e.g., a current value of the collection), as well as an overall current value 416 for each of the saved objects. Thus, a user may form collections of saved objects as desired and interact with these collections as desired, such as to generate an automated listing together to sell the collection individually or as a whole.

FIG. 5 depicts an example implementation 500 of the user interface 308 as configured to both buy and sell objects using saved objected recognized and processed by the camera platform. In this example, user selections are received to sell items corresponding to the pitcher and vase in digital images 402, 404 and buy another lamp corresponding to digital image 406. In response, the object inventory manager module 120 collects metadata describing respective prices to sell 408, 410 and buy 502 the objects. Metadata is also generated and output in the user interface 308 describing an overall value of items being bought 504 as well as an overall value of items being sold 506. An overall change in value 508 is also output in the user interface 308.

A user, for instance, may desire to buy the additional lamp 502 and therefore sell some objects to cover this cost. Through use of the saved objects by the platform in this example, a user may quickly and efficiently determine how to make this happen, which is not possible in conventional techniques that could be cumbersome.

FIG. 6 depicts another example implementation 600 of use of a camera platform to aid purchase or sale of objects recognized in digital images collected from a digital camera. In this example, the user interface 308 also displays a live feed of a digital image that includes an object in a physical environment, e.g., object itself, physical photograph of the object, and so forth. In response, the object inventory manager module 120 includes user selectable options to buy 602 or sell 604 to product, e.g., laundry detergent.

The object inventory manager module 120 also, through object recognition, recognizes that the object has been purchased before. This may be performed based on data local to the computing device 102 and/or through communication with the service provider system 104. In response, AR digital content 126 is rendered in the user interface 308 as an option to "buy again" 606, to purchase a subscription at a reduced price. Thus, in this example the user 108 may readily navigate through a physical environment and purchase goods as needed in an efficient and intuitive manner.

Other examples are also contemplated. In a first such example, a user may capture a digital image of an object, for which, an upgraded model is not currently available but will be made available in the near future. Thus, the metadata may describe availability of this new model as well as options to sell the user's current model. In a second such example, the metadata is information, such as to indicate when to change a battery in a smoke detector, indicate cost saving that may be realized by switching to a new version of a product (e.g., a LED light that saves 85% energy), and so forth.

Camera Platform and User Profiles

Figure 7:
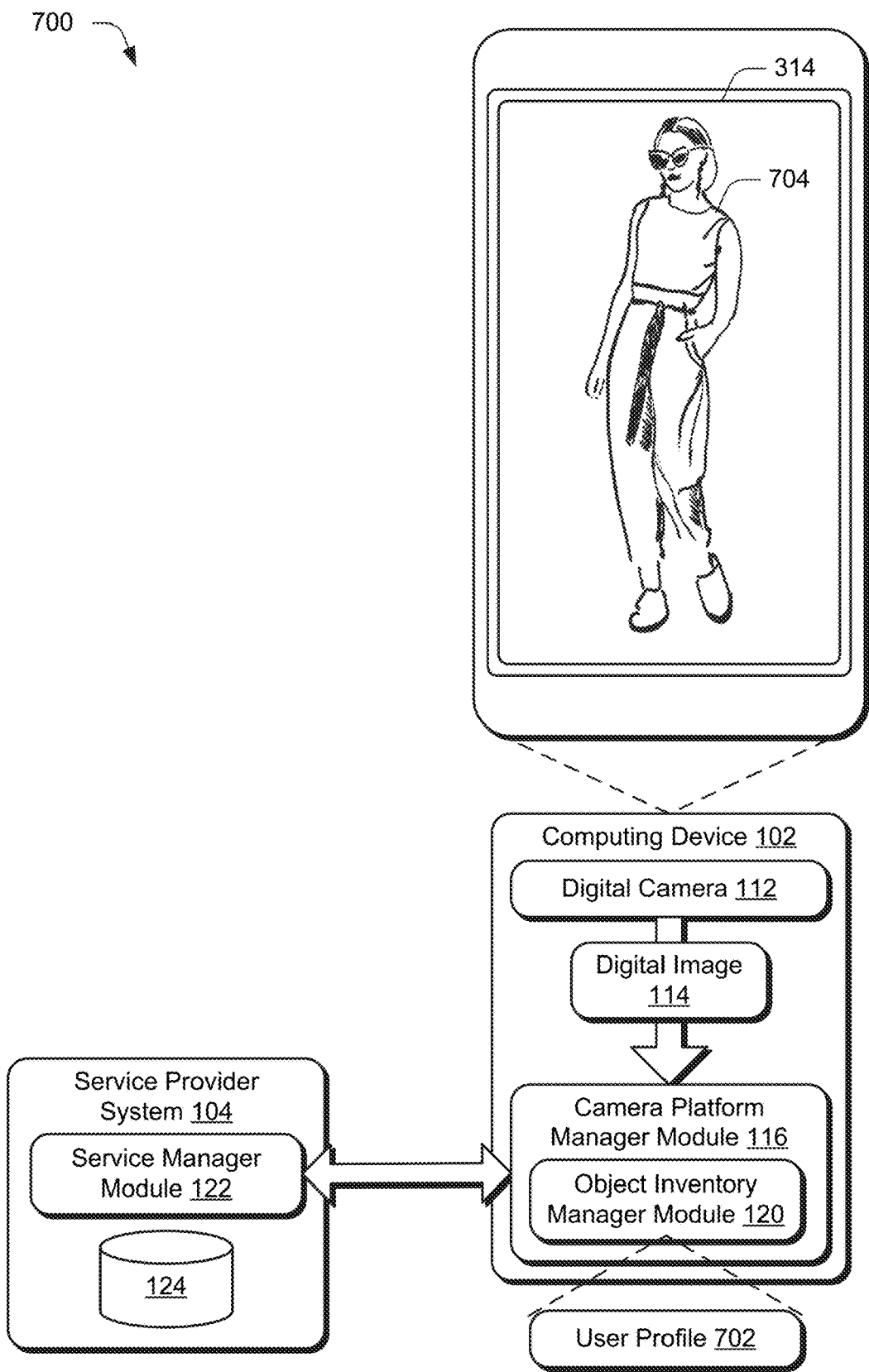
FIG. 7 depicts a system in an example implementation showing operation of the camera platform manager module of FIG. 1 in greater detail as employing a user profile.
Figure 8:
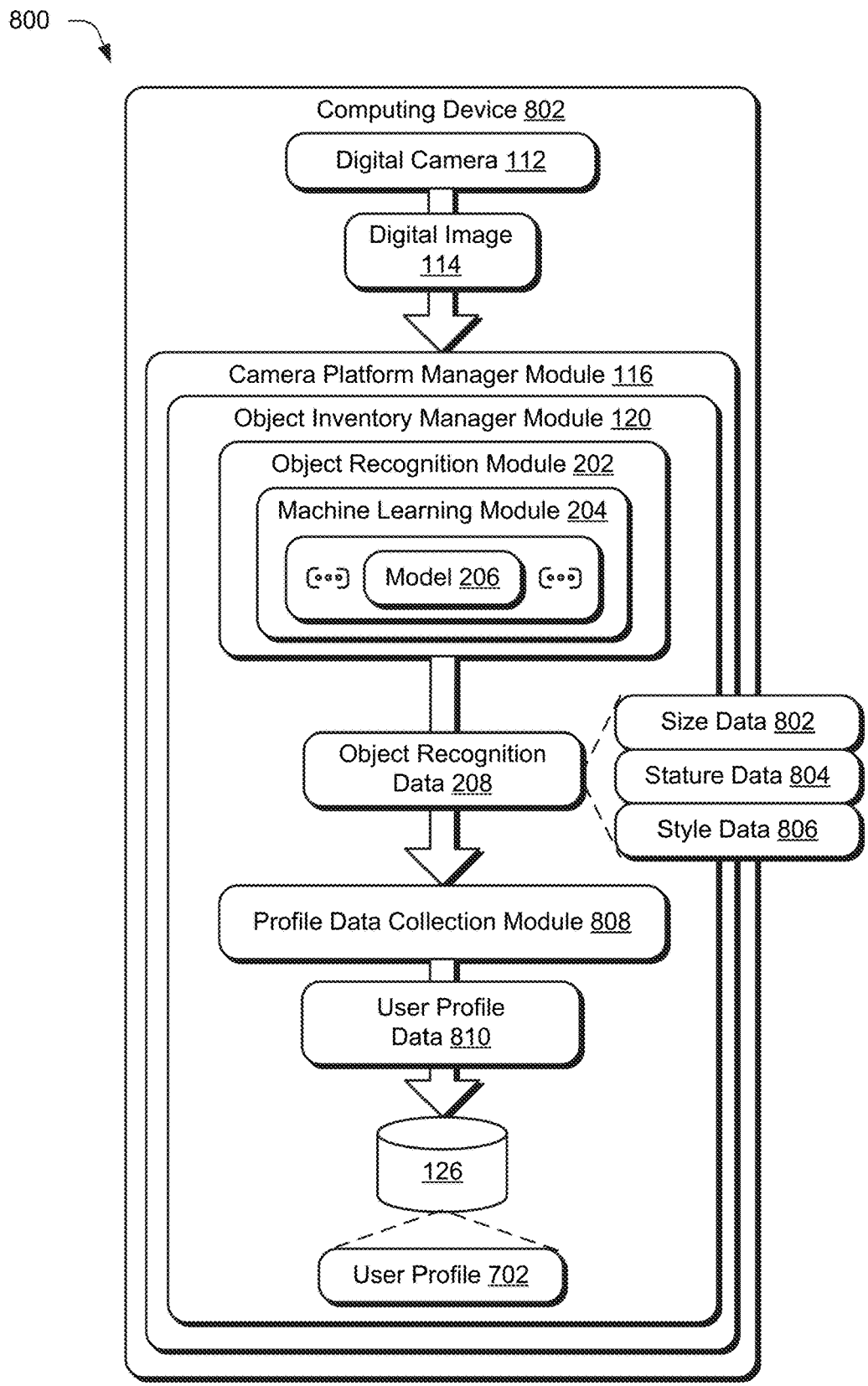
FIG. 8 depicts an example implementation of generation of the user profile based at least in part on machine learning.
Figure 9:
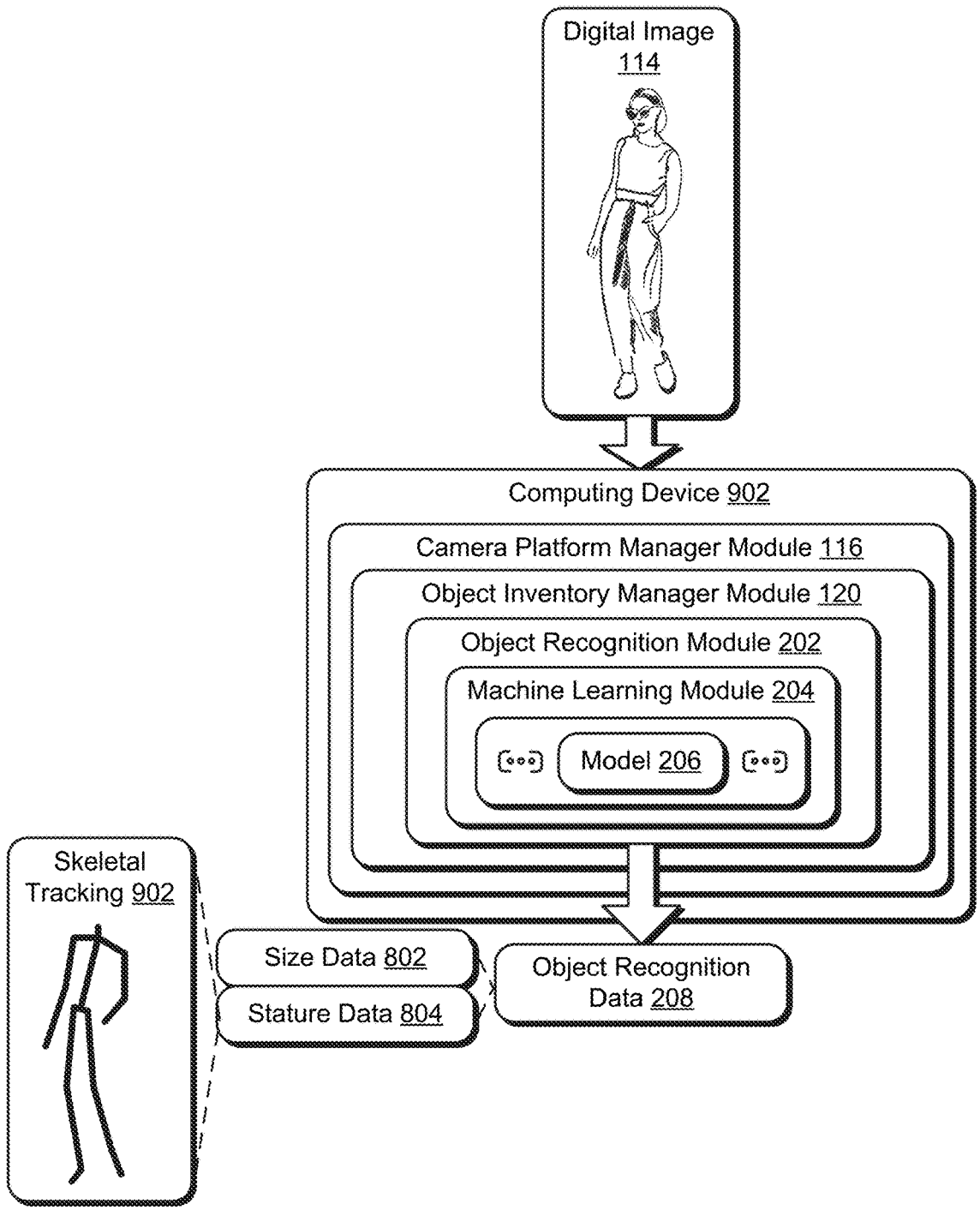
FIG. 9 depicts an example implementation of generation of the user profile based at least in part on stature data.
Figure 10:
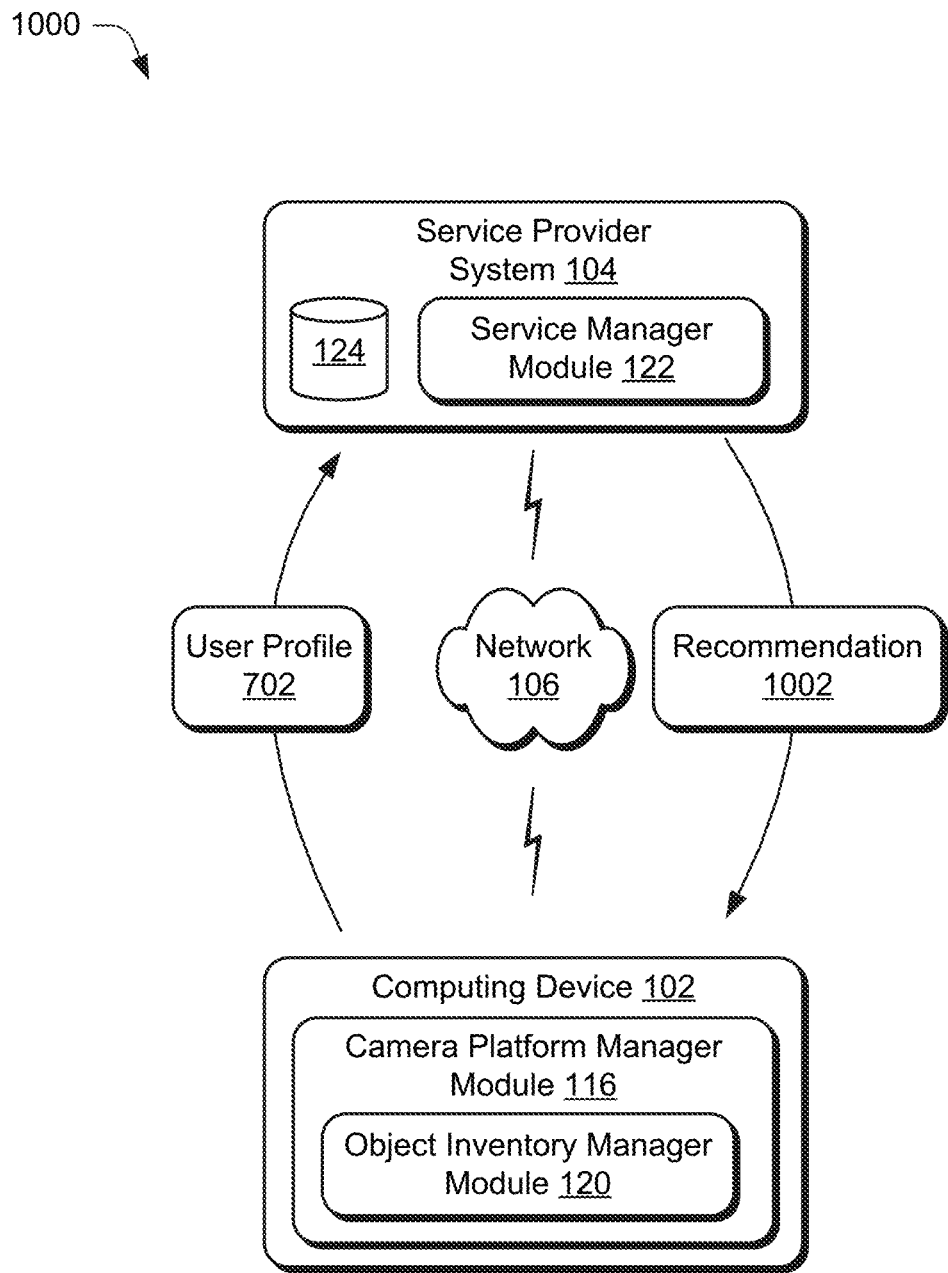
FIG. 10 depicts an example system of obtaining a recommendation based on the generated user profile of FIG. 8.
Figure 11:
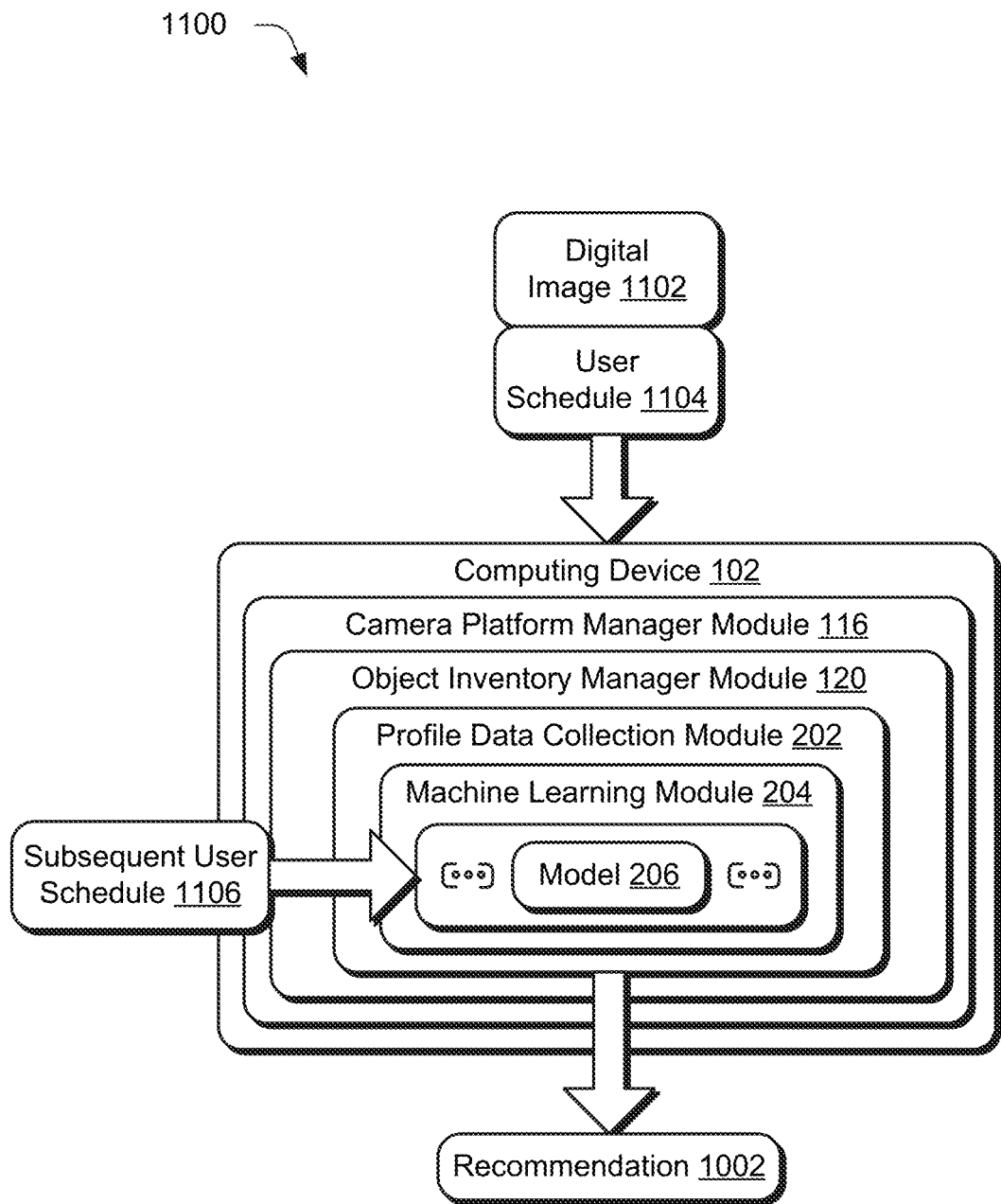
FIG. 11 depicts an example implementation in which a user schedule is employed along with digital images to generate a user profile using machine learning that is used as a basis to generate a recommendation.
Figure 12:
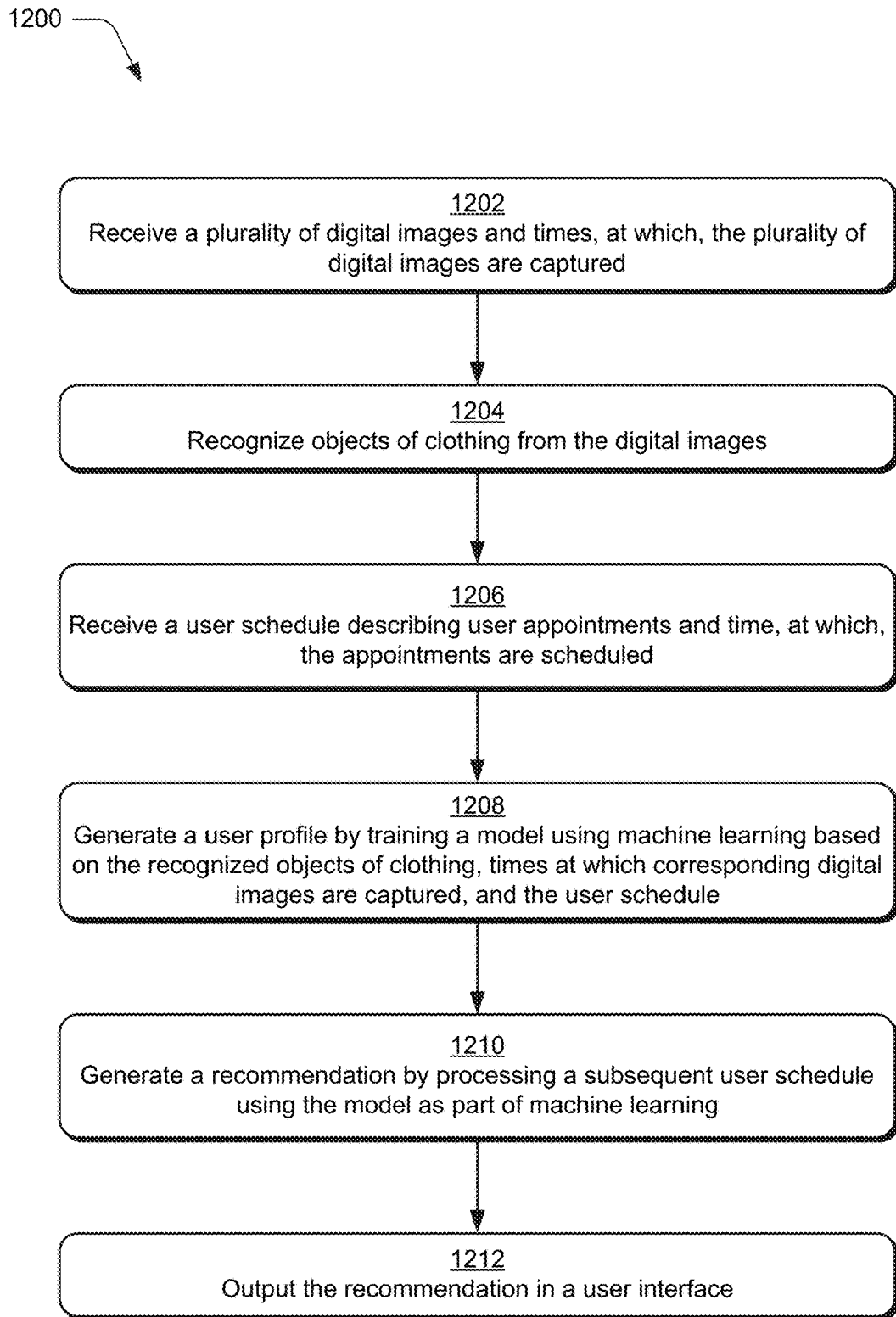
FIG. 12 is a flow diagram depicting a procedure in an example implementation in which a user schedule and digital images are used to train a model using machine learning to generate user recommendations.

FIG. 7 depicts a system 700 in an example implementation showing operation of the camera platform manager module 116 of FIG. 1 in greater detail as employing a user profile. FIG. 8 depicts an example implementation 800 of generation of the user profile based at least in part on machine learning. FIG. 9 depicts an example implementation 900 of generation of stature data. FIG. 10 depicts an example system 1000 of obtaining a recommendation based on the generated user profile of FIG. 9. FIG. 11 depicts an example implementation 1100 involving use of a live feed and user schedule. FIG. 12 depicts a procedure 1200 in an example implementation of training and use of a model using machine learning based on object recognition and a user schedule.

The following discussion describes techniques that may be implemented utilizing the previously described systems and devices. Aspects of the procedure as shown stepwise by the modules of FIGS. 8 and 9 and blocks of FIG. 12 may be implemented in hardware, firmware, software, or a combination thereof. The procedure is shown as a set of blocks that specify operations performed by one or more devices and are not necessarily limited to the orders shown for performing the operations by the respective blocks. In portions of the following discussion, reference will be made to FIGS. 7-12.

In this example, the object inventory manager module 120 leverages the camera platform 118 to make recommendations for a user 108. The digital image 114, for instance, may also be processed by the object inventory manager module 120 using object recognition as implemented using machine learning. In this example, the digital images 114 are used to generate a profile (e.g., a user profile 702) based on characteristics learned from the digital images 114, e.g., characteristics of objects such as clothes worn by a user. This profile 702 is then used as a basis to form recommendations (e.g., through machine learning as further described in relation to FIG. 8), such as to configure digital marketing content having product suggestions based on these characteristics.

The profile, for instance, may be generated from digital images taken of the user 704. From this, the object inventory manager module 120 may determine a likely size (e.g., dimensions) of the user 704, stature (e.g., how a user wears clothing such as tight, loose, or otherwise how the clothing "hangs" on the user), style (e.g., professional, hippy, grunge, medieval), and so forth. Digital images 114 may also be collected from sources that do not include the user but are desired by the user, e.g., of other humans in person, from physical photos, and so forth.

From this, the object inventory manager module 120 may generate recommendations based on the user profile, such as to generate digital marketing content for products or services based on the size, stature, and style described in the user profile. In this way, the object recognition module may increase accuracy and as a result increase computational efficiency in generation of recommendations based on the camera platform 118.

FIG. 8 depicts an example 800 of generation of the user profile 702 of FIG. 7 in greater detail. To begin, a digital image 114 is obtained by the camera platform manager module 116 as before. The digital image 114, for instance, may be captured using a digital camera, as a screenshot captured from a frame buffer of the computing device 102, and so forth.

The digital image 114 is then processed by an object recognition module 202 to recognize an object within the digital image 114. The object recognition module 202, for instance, may employ a machine learning module 204 configured to employ models 206 usable to recognize the object using machine learning, e.g., neural networks. The models 206, for instance, may be trained using digital images that are tagged with corresponding identifications. In an implementation, these digital images and tags are obtained from a commerce service provider system that are tagged by sellers using the system. That tags, for instance, may indicate a type of object, style of object, and so forth. As a result, a multitude of digital images may be obtained for training with minimal computation and user cost as opposed to conventional manual tagging techniques. Although illustrated as implemented locally by the computing device 102, this functionality may also be implemented in whole or in part by a service provider system 104 via the network 106.

Thus, the object recognition data 208 describes an object included in the digital image 114. The machine learning module 204, and corresponding models, are also trained to identify a likely size, stature, and style exhibited in the digital image 114 and thus output size data 802, stature data 804, and style data 806 as part of the object recognition data 208. The size data 802 may include likely overall dimensions of the user 704, likely clothing sizes worn by the user, and so forth.

The stature data 804 describes how the user 704 wears the clothes, e.g., oversized, tight fitting, athletic, and so forth. The stature data 804, for instance, may be determined through a comparison of skeletal tracking of the user 704 (e.g., using a structured light camera or time-of-flight camera) with overall size of the clothes, e.g., "how the clothing hangs on the user" such as baggy in the illustration.

As illustrated in the example implementation 900 of FIG. 9, for instance, a digital image 114 may be received as previously described. From this digital image 114, skeletal tracking 902 is performed to indicate locations of joints of a user as captured in the digital image 114 and distances between those joints, i.e., lengths of skeletal segments. These distances are compared with size data 802 of the user in relation to the object of clothing worn by the user. This comparison results in stature data 804 that describes a relationship between the size of the clothing worn by the user and a size of the user and thus describes "how the object of clothing hangs" on the user, e.g., baggy, fitted, preference toward longer sleeves, and so forth. In this way, stature data 804 may go beyond merely describing whether an object of clothing is likely to fit a user to describe how that fit is desired by the user as exhibited by the digital image 114.

The style data 806 describes a style exhibited by the clothing of the user 704 and/or the user 704, herself. The style data 806, for instance, may also be obtained as part of object recognition to identify not only an object included in a digital image but also a style exhibited by the object. As previously described, for instance, style data 806 may be trained as part of a model based on tags of the digital images 114, e.g., by a commerce service provider system. Thus, style data 806 can transcend different types of objects, e.g., for fashion this may include formal, casual, modern, hipster, and so forth.

The digital image 114 may also be captured of other users that have favorable characteristics, e.g., of a person on a street having a desired jacket, a digital image taken of a physical photograph of a popstar in a physical magazine, and so forth. Thus, this object recognition data 208 is collected by a profile data collection module 808 to generate user profile data 810 that describes the user and/or characteristics of other users as recognized from the digital image 114.

As shown in FIG. 10, the user profile 702 may then be communicated to the service provider system 104, which forms a recommendation 1002 based on the user profile. The recommendation 1002, for instance, may be generated using machine learning based on a user segment, to which, the user belongs as identified through non-negative matrix factorization. In this way, the camera platform 118 of the object inventory manager module 120 may address likely user desires based on the digital images and object recognition supported by the platform. Although describes as implemented by the computing device 102, this functionality may also be implemented in whole or in part by the service provider system 104, e.g., in response to communicated images as part of a social network service.

FIG. 11 depicts an example implementation 1100 in which a user schedule 1102 is employed along with digital images 114 to generate a user profile 702 using machine learning that is used as a basis to generate a recommendation. In this example, digital images 1102 and associated times, at which, those images are captured are received by the profile data collection module 202. The digital images 1102, for instance, may be captured over a period-of-time as part of a live camera feed as described earlier, from a collection of still images, and so forth.

A user, for instance, may capture digital images that includes the user as well as objects of clothing worn by the user at different times of day, days of the week, and so forth. A user schedule 1104 is also received 1104, through access granted to a user's calendar application as executed by the computing device. The user schedule 1104, for instance, includes text that describes appointments and respective times of the appointments of the user.

The digital images 1102 and user schedule 1104 are then used to train a model 206 using machine learning. To do so, object recognition may be used as previously described to identify objects (e.g., using machine learning) in the digital images 1102, which may also include size data 802, stature data 804, and style data 806. The recognized objects and characteristics of those objects are then used along with the user schedule 1104 to train the model 206 using machine learning, e.g., as part of a neural network. The model 206, once trained, may then be used to process a subsequent user schedule 1106 to generate recommendations 1102 based on that schedule. In this way, the model 206 may be trained over time to make a correlation between what is worn by a user on a particular point-in-time and an activity associated with that point in time from the user schedule 1104.

Accordingly, a subsequent user schedule 1106 (which may be a continuation of access to the user schedule 1104) may be processed by the model 206 of the machine learning module 204 to generate a recommendation 1002. The recommendation 1102, for instance, may describe an object of clothing to be worn by a user at a future point in time, e.g., to wear a suit for an upcoming meeting. In another instance, the recommendation 1102 may describe an object of clothing for purchase by a user, such as from a commerce provider system as described in the previous section. In a further instance, the recommendation 1102 may also take into account geographical considerations, such as to make a recommendation 1002 specifying "what to pack" for a vacation to a particular location based on weather conditions predicted for that location. In this way, the model 206 may richly and dynamically address ever changing situations of a user and make recommendations accordingly.

FIG. 12 depicts a procedure 1200 in an example implementation in which a user schedule and digital images are used to train a model to make recommendations. To begin, a plurality of digital images and data describing times, at which, the plurality of digital images are captured is received (block 1202). The camera platform manager module 116, for instance, may receive digital images 114 from a digital camera 112 from a live feed in real time, from a storage device, and so on. The digital images 114 may have associated metadata that describes "when" respective digital images are captured, e.g., a timestamp.

Objects of clothing are recognized from the digital images (block 1204). An object recognition module 202, for instance, may employ machine learning to recognize types of objects of clothing as well as characteristics, such as color, pattern, stature (i.e., how the objects are worn by a user), and so forth.

A user schedule is also received that describes user appointments and times, at which the appointments are scheduled (block 1206). The camera platform manager module 116, for instance, may be given access to a user's calendar as maintained by a calendar application of the computing device 102.

A user profile is generated by training a model 206 using machine learning based on the recognized objects of clothing, times at which corresponding digital images are captured, and the user schedule 1104 (block 1208). In this way, the model 206 as shown in FIG. 11 correlates appointments of the user with what the user wore to those appointments.

A recommendation is generated by processing a subsequent user schedule 1106 using the model as part of machine learning (block 1210). The recommendation is then output in a user interface (block 1212), e.g., as part of the live feed using augmented reality content. The recommendation, for instance, may suggest an object of clothing to be worn by the user that was previously worn based on the identified correlation. In another instance, the recommendation identifies an object of clothing to be purchased by the user based on an upcoming appointment, e.g., from a commerce service provider system that makes the object available via an auction and/or directly upon payment of a specified amount. The outputting may be performed using AR digital content, e.g., to show the object "on" the user, an accessory disposed adjacent to the user, and so forth. Other instances are also contemplated.

Example System and Device

Figure 13:
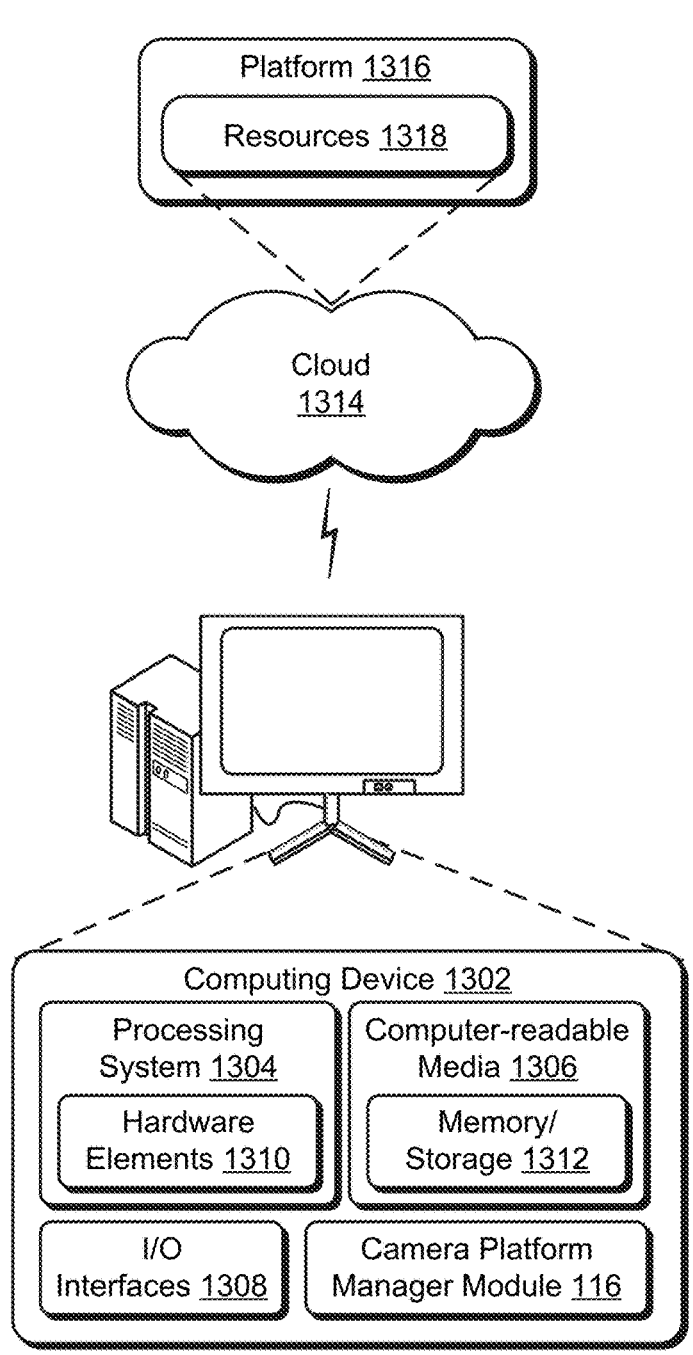
FIG. 13 illustrates an example system including various components of an example device that can be implemented as any type of computing device as described and/or utilize with reference to FIGS. 1-12 to implement embodiments of the techniques described herein.

FIG. 13 illustrates an example system generally at 1300 that includes an example computing device 1302 that is representative of one or more computing systems and/or devices that may implement the various techniques described herein. This is illustrated through inclusion of the camera platform manager module 116. The computing device 1302 may be, for example, a server of a service provider, a device associated with a client (e.g., a client device), an on-chip system, and/or any other suitable computing device or computing system.

The example computing device 1302 as illustrated includes a processing system 1304, one or more computer-readable media 1306, and one or more I/O interface 1308 that are communicatively coupled, one to another. Although not shown, the computing device 1302 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1304 is representative of functionality to perform one or more operations using hardware. Accordingly, the processing system 1304 is illustrated as including hardware element 1310 that may be configured as processors, functional blocks, and so forth. This may include implementation in hardware as an application specific integrated circuit or other logic device formed using one or more semiconductors. The hardware elements 1310 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1306 is illustrated as including memory/storage 1312. The memory/storage 1312 represents memory/storage capacity associated with one or more computer-readable media. The memory/storage component 1312 may include volatile media (such as random access memory (RAM)) and/or nonvolatile media (such as read only memory (ROM), Flash memory, optical disks, magnetic disks, and so forth). The memory/storage component 1312 may include fixed media (e.g., RAM, ROM, a fixed hard drive, and so on) as well as removable media (e.g., Flash memory, a removable hard drive, an optical disc, and so forth). The computer-readable media 1306 may be configured in a variety of other ways as further described below.

Input/output interface(s) 1308 are representative of functionality to allow a user to enter commands and information to computing device 1302, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1302 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1302. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1302, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1310 and computer-readable media 1306 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1310. The computing device 1302 may be configured to implement particular instructions and/or functions corresponding to the software and/or hardware modules. Accordingly, implementation of a module that is executable by the computing device 1302 as software may be achieved at least partially in hardware, e.g., through use of computer-readable storage media and/or hardware elements 1310 of the processing system 1304. The instructions and/or functions may be executable/operable by one or more articles of manufacture (for example, one or more computing devices 1302 and/or processing systems 1304) to implement techniques, modules, and examples described herein.

The techniques described herein may be supported by various configurations of the computing device 1302 and are not limited to the specific examples of the techniques described herein. This functionality may also be implemented all or in part through use of a distributed system, such as over a "cloud" 1314 via a platform 1316 as described below.

The cloud 1314 includes and/or is representative of a platform 1316 for resources 1318. The platform 1316 abstracts underlying functionality of hardware (e.g., servers) and software resources of the cloud 1314. The resources 1318 may include applications and/or data that can be utilized while computer processing is executed on servers that are remote from the computing device 1302. Resources 1318 can also include services provided over the Internet and/or through a subscriber network, such as a cellular or Wi-Fi network.

The platform 1316 may abstract resources and functions to connect the computing device 1302 with other computing devices. The platform 1316 may also serve to abstract scaling of resources to provide a corresponding level of scale to encountered demand for the resources 1318 that are implemented via the platform 1316. Accordingly, in an interconnected device embodiment, implementation of functionality described herein may be distributed throughout the system 1300. For example, the functionality may be implemented in part on the computing device 1302 as well as via the platform 1316 that abstracts the functionality of the cloud 1314.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by a computing device, the method comprising:

obtaining, by the computing device, digital images including objects, times at which the digital images are captured, and a user schedule including appointments corresponding to the times the digital images are captured;

recognizing, by the computing device, the objects;

training, by the computing device, a machine learning model to generate a user profile based on the objects recognized, the times at which the digital images are captured, and the user schedule; and generating, by the computing device, the user profile via the machine learning model.

2. The method as described in claim 1, wherein the obtaining includes locations at which the digital images are captured and wherein the training of the machine learning model to generate the user profile is based on the locations.

3. The method as described in claim 1, wherein the user schedule is a training schedule including weather conditions at times and locations of the appointments.

4. The method as described in claim 1, further comprising:

generating, by the computing device, a recommendation of an object based on the user profile; and outputting, by the computing device, the recommendation in a user interface.

5. The method as described in claim 4, wherein the recommendation is output as augmented reality content.

6. The method as described in claim 5, wherein the augmented reality content is output in the user interface along with a direct view of a physical environment of the computing device.

7. The method as described in claim 6, wherein the direct view is part of a live feed.

8. The method as described in claim 4, wherein the object is clothing.

9. The method as described in claim 4, wherein the recommendation of the object is selectable via the user interface to begin a purchase from a service provider system via a network.

10. The method as described in claim 9, wherein the object is available via an online auction.

11. A computing device comprising:

a processing system; and a computer-readable storage medium having stored instructions that, responsive to execution by the processing system, induce the processing system to perform operations comprising:

obtaining digital images including objects, times at which the digital images are captured, and a user schedule including appointments corresponding to the times the digital images are captured;

recognizing the objects;

training a machine learning model to generate a user profile based on the objects recognized, the times at which the digital images are captured, and the user schedule; and generating the user profile via the machine learning model.

12. The computing device as described in claim 11, wherein at least one of a size, a stature, or a style are described in the user profile.

13. The computing device as described in claim 11, further comprising:

generating a recommendation of an object based on the user profile; and outputting the recommendation in a user interface.

14. The computing device as described in claim 13, wherein the recommendation is output as augmented reality content.

15. The computing device as described in claim 14, wherein the augmented reality content is output in the user interface along with a direct view of a physical environment of the computing device.

16. The computing device as described in claim 15, wherein the direct view is part of a live feed.

17. The computing device as described in claim 13, wherein the object is clothing.

18. A non-transitory computer-readable storage medium storing executable instructions, which when executed by a processing device, induce the processing device to perform operations comprising:

obtaining digital images including objects, times at which the digital images are captured, and a user schedule including appointments corresponding to the times the digital images are captured;

recognizing the objects;

training a machine learning model to generate a user profile based on the objects recognized, the times at which the digital images are captured, and the user schedule; and generating the user profile via the machine learning model.

19. The non-transitory computer-readable storage medium as described in claim 18, wherein the user profile describes a size, a stature, and a style.

20. The non-transitory computer-readable storage medium as described in claim 18, further comprising:

generating a recommendation of an object based on the user profile; and outputting the recommendation in a user interface.

* * * * *